May 12, 1931.  H. W. EARL  1,804,598
INTERNAL COMBUSTION ENGINE
Filed July 18, 1928  3 Sheets-Sheet 1
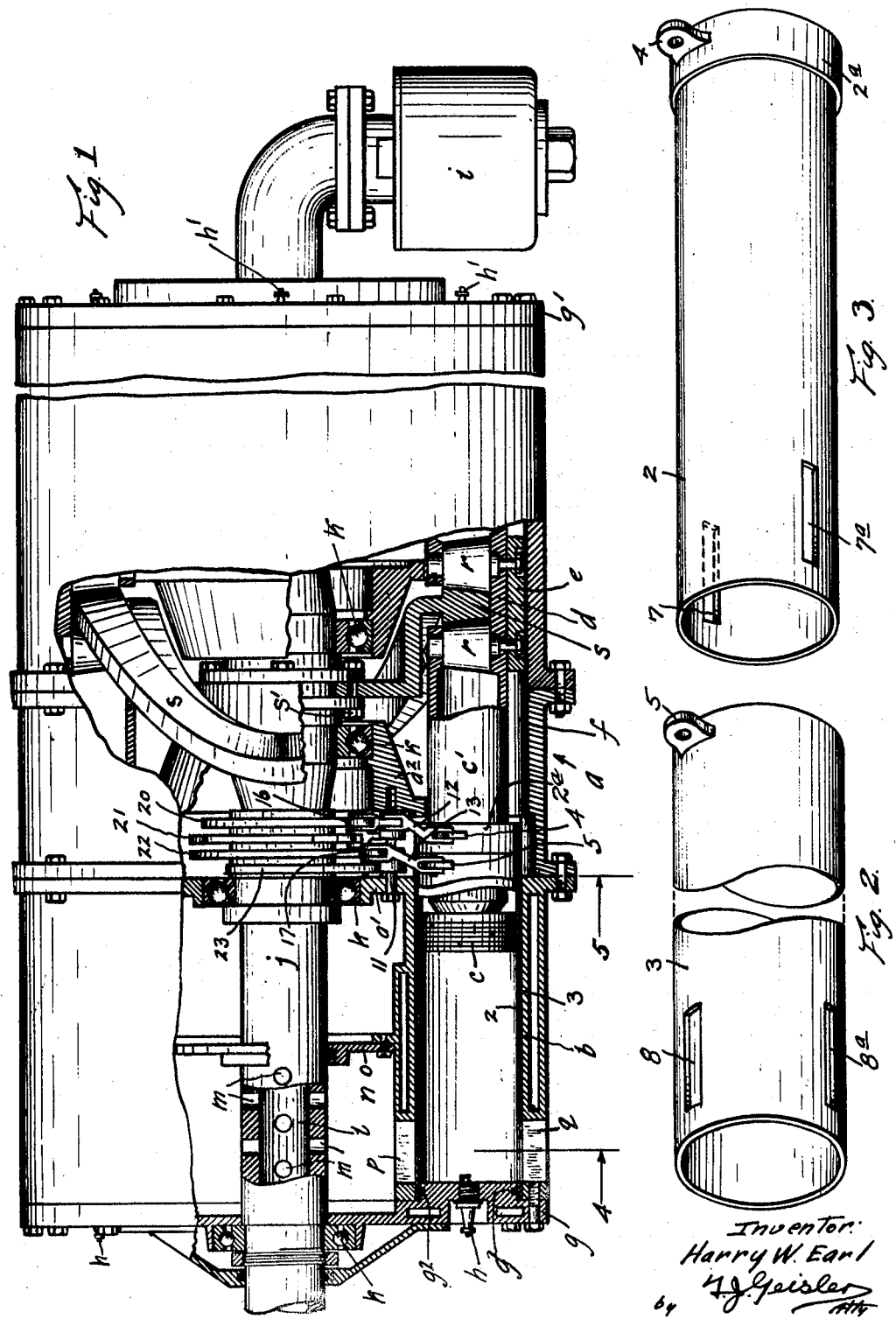
Inventor:
Harry W. Earl
by J. Geisler
Atty

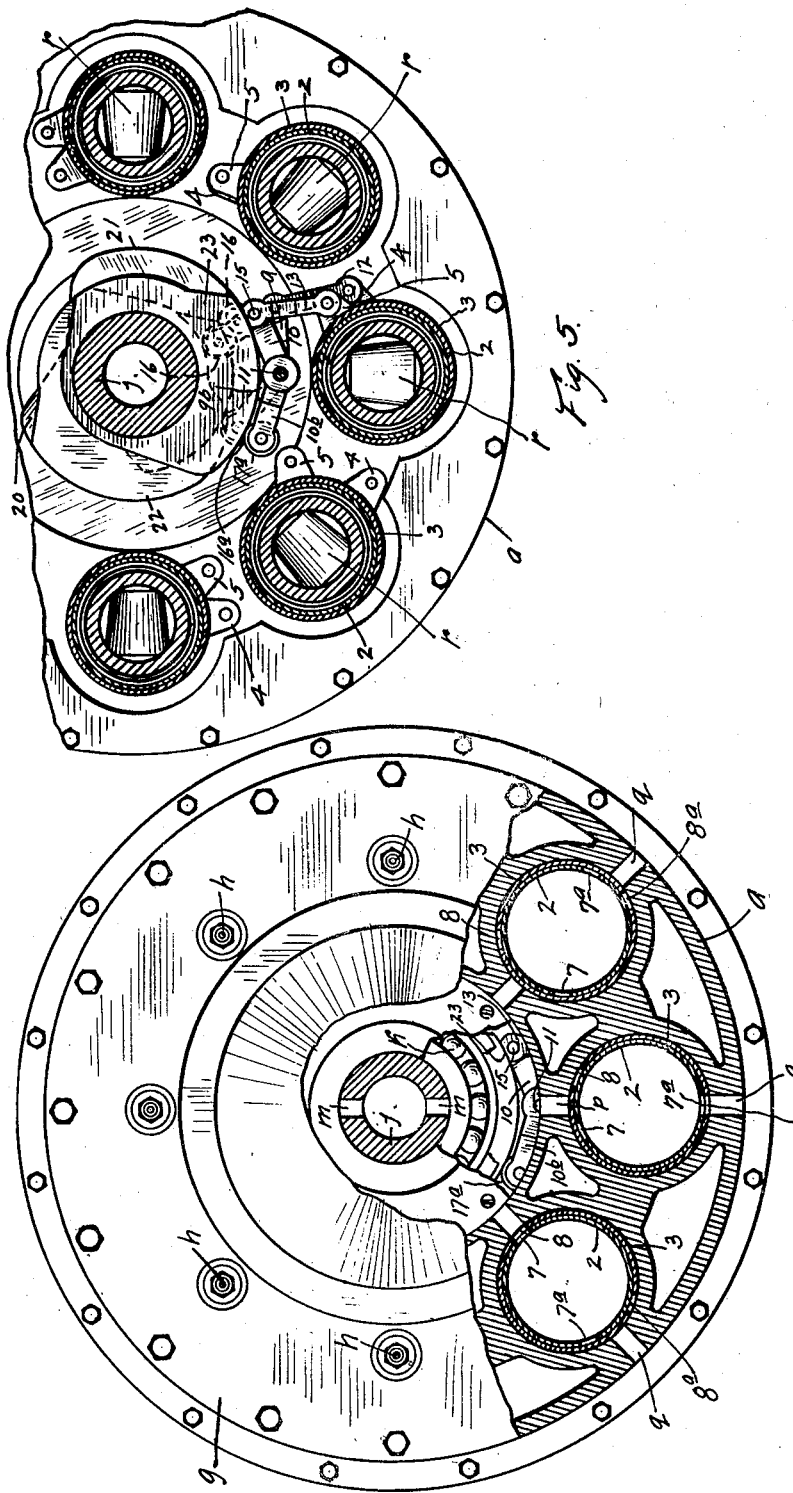

May 12, 1931.   H. W. EARL   1,804,598
INTERNAL COMBUSTION ENGINE
Filed July 18, 1928   3 Sheets-Sheet 3
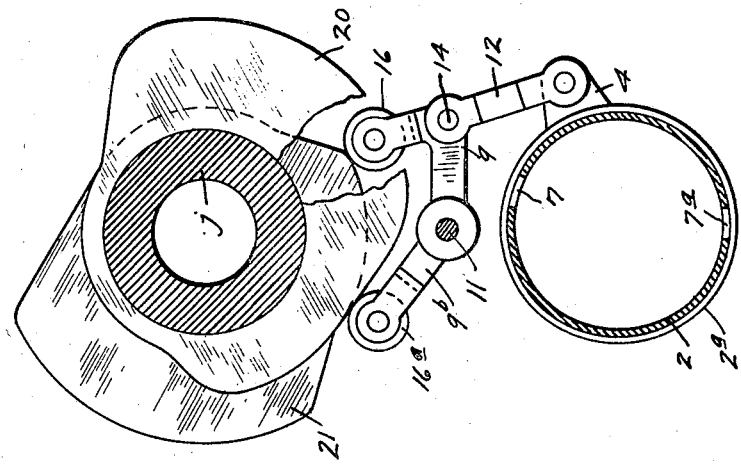
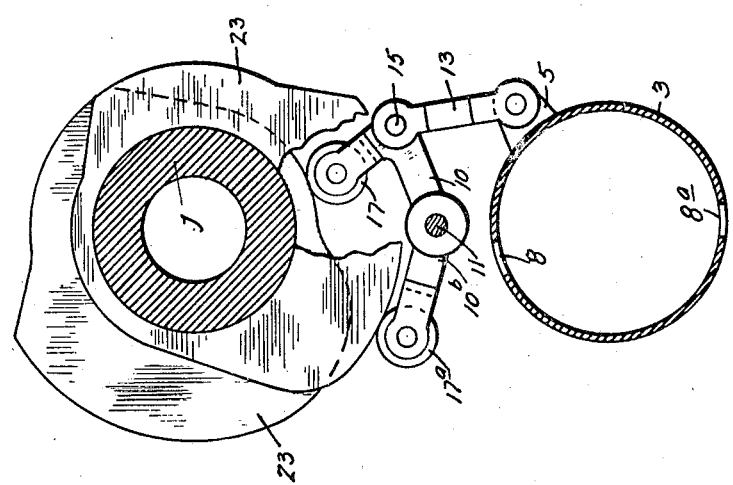
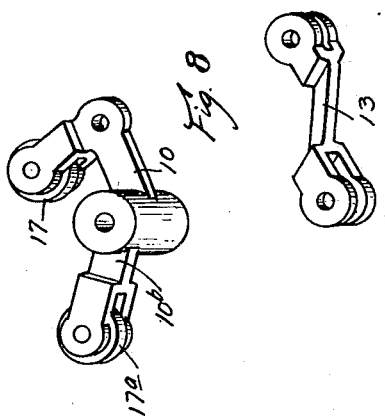
Inventor:
Harry W. Earl
by J. J. Geisler
Atty.

Patented May 12, 1931

1,804,598

UNITED STATES PATENT OFFICE

HARRY W. EARL, OF PORTLAND, OREGON, ASSIGNOR TO EARL AIRCRAFT CORPORATION, OF PORTLAND, OREGON, A CORPORATION OF OREGON

INTERNAL COMBUSTION ENGINE

Application filed July 18, 1928. Serial No. 293,674.

My invention relates to multi-cylinder internal combustion engines in which the longitudinal action of the cylinders is parallel with the longitudinal axis of the drive-shaft, and to oscillatory sleeve valves for the cylinders thereof.

The valves which have heretofore been provided for multi-cylinder engines have had the following disadvantages.

The longitudinally moving sleeve valve, provided with ports which are brought into registration with each other and the cylinder ports, tend to create a pumping action carrying oil from the crank case into the cylinder and conversely carrying gasoline into the crank case; and in the so-called poppet valve the ports are always partly obstructed when open, by the valve member which is only lifted from the valve seat a relatively short distance.

The object of my invention is to provide a rotary sleeve valve mechanism, especially adapted for multicylinder engines having the cylinders arranged parallel with the drive shaft and the sleeve valve elements arranged within the said cylinder whereby the pistons will reciprocate within said sleeve valve elements.

A further object of my invention is to provide a rotary sleeve valve mechanism in which there will be no pumping action and in which the valve ports when opened will provide an unobstructed port for the rapid intake and exhaust of the gases of the engine. And further to provide a rapid opening and closing movement of the valve sleeves, and a substantially slower rate of movement between the opening and closing movements, so that on the intake stroke of the pistons, the gases may be drawn quickly and cleanly into the cylinder and then sufficient time will be provided for the compression and firing of the charge, and then a quick opening of the exhaust port for the rapid and unimpeded scavenging of the exhausted gases and then a quick closing of the exhaust port and a quick opening of the intake port.

Such valve actions have heretofore been attained by the so-called poppet valve, but with the disadvantages above set forth and the further disadvantage that the poppet valve is reseated by the action of springs which do not give a positive action and which wear and break.

A further object of my invention is to provide a rotary sleeve valve mechanism, both movements of which will be positive, that is, neither one of which is dependent on the reaction of some member such as a spring to provide either the opening or closing movement.

Another object of my invention is to provide a rotary sleeve valve mechanism especially for internal combustion engine, adapted for use in aircrafts, in which the operating parts are all contained within the engine housing and which comprises relatively few parts, positive in action and not liable to get out of order or break.

I attain these and other incidental objects of my invention in an internal combustion engine comprising a shaft and a cylinder arranged parallel with the shaft, having a sleeve valve element comprising two members rotatable one within the other, a piston reciprocated within said sleeve valve element, a driving connection between the piston and the shaft, plural transverse cams carried by said shaft in parallel planes, rocker arms operated by said cams, said rocker arms having two oppositely extending members one thereof riding on one, and the other riding on the other of said cams with rollers journaled in the ends of the members of said rocker arms and links connecting the rocker arms with the members of said valve elements, respectively, the contour of said cams being adapted to impart to said rocker arms an arcuate reciprocating movement, whereby to operate the members of said sleeve valve element relatively to the operation of said piston.

These and other incidental objects of my invention and the details of construction and mode of operation thereof are hereinafter fully described with reference to the accompanying drawings.

In the drawings:

Fig. 1 shows a fragmentary side elevation of my engine and illustrates by parts broken away, the inclosed mechanism;

Figs. 2 and 3 show perspective views of the inner and outer valve sleeves provided in each cylinder;

Fig. 4 shows a section taken on the line 4—4 of Fig. 1 looking in the direction of the arrows, and illustrates further details of construction;

Fig. 5 shows a section taken on the line 5—5 of Fig. 1 illustrating further details of construction;

Fig. 6 shows diagrammatically a transverse section of the drive-shaft and the valve operating mechanism and the inner valve-sleeve, all removed from the engine;

Fig. 7 shows similarly the operating mechanism of the outer valve-sleeve; and

Fig. 8 shows a perspective view of the rocker-arm and link connecting the valve operating mechanism and the valve sleeve.

Referring now to the drawings, in Fig. 1, I show a cylindrical housing $a$, carrying at each end in this embodiment of my invention, eight circumferentially arranged and opposed cylinders $b$, which are aligned, respectively and are parallel with the central longitudinal axis of the housing. Pistons $c$ are mounted in said cylinders and the piston stems $c'$ of each set of opposite cylinders are rigidly secured together by a connecting portion $d$, provided with a guide $e$, sliding in a longitudinal groove $f$ in the engine housing.

Each end of the housing $a$ is closed by circular plates or heads $g$, $g'$, carrying igniting devices $h$, $h'$, the plates also carrying the carbureting apparatus $i$. Packing rings $g2$ are provided between the ends of the cylinder walls and the heads $g$, $g'$ to effectively seal them and prevent leakage of compression from the cylinders.

A drive shaft $j$ is centrally journaled in said housing, parallel with the cylinders $b$, on suitable antifriction bearings $k$.

The cylinders at each end of the housing $a$ are identical, as are the pistons and other parts, and the pistons and other mechanism of each cylinder are identical, so I will only describe one end of the engine and in detail only one piston.

The shaft $j$ is provided with a central longitudinal passageway $l$ connecting at one end with the carbureting apparatus $i$ and opening through radial ports $m$ into a cylindrical fuel chamber $n$, surrounding the said shaft and formed by the adjacent cylinder walls, the plate $g$ and a partition $o$.

Elongate, longitudinally arranged, intake ports $p$ are provided in said cylinder walls opening from the chamber $n$. Exhaust ports $q$ are provided directly opposite the intake ports $p$ and discharging into a suitable exhaust manifold, not shown.

The piston stems $c'$ are hollow and carry on their inner ends, rollers $r$ which bear on the adjacent sides of a compound spiral cam $s$ of four convolutions, centrally fixed to the drive shaft $j$ by bolts $s'$.

In the cylinders $b$ are provided two concentric valve sleeves 2 and 3 between the cylinder walls and the pistons, Figs. 2 and 3. The former adapted to be seated within the latter, but of greater length, the projecting portion of which is provided with a flange 2$a$. Elongate, longitudinal ports 7, 7$a$, and 8, 8$a$ which are circumferentially arranged, and spaced apart approximately 197 degrees, are provided in the valve-sleeve adjacent their other ends respectively, which are adapted to register with the intake and exhaust ports $p$ and $q$ of the cylinders. The ports of the valve-sleeves are spaced apart more than 180 degrees in order that, the ports $p$ and $q$ being oppositely arranged will not be opened simultaneously, as would be the case were the ports of the valve-sleeves arranged oppositely.

The sleeves 2 and 3 are somewhat longer than the cylinders and project beyond the inner ends, as illustrated in Fig. 1, and these projecting ends are provided with lugs 4 and 5.

For each cylinder, I provide two rocker-arms 9 and 10, Figs. 6, 7 and 8, pivoted as at 9$a$ and 10$a$ on a bolt 11, mounted in the interior flanges $a'$, $a2$ of the housing $a$, adjacent the inner extremities of the sleeves 2 and 3, and connected thereto by links 12 and 13, pivotally secured at their ends to the lugs 4 and 5 and to the rocker arms as at 14 and 15 respectively.

I mount on the shaft $j$, adjacent the said rocker arm, four parallel cams 20, 21, 22, 23, and cam rollers 16, 16$a$, 17, and 17$a$ are provided on the respective ends of the rocker arms 9 and 10, which bear on the said cams.

The ends 9$b$ and 10$b$ of the rocker arms are offset laterally, so that the roller 16$a$ bear on the cam 20, and the roller 16 on the cam 21. The rollers 17 and 17$a$ bear correspondingly on the cams 22 and 23.

The greatest axes of the said cams are so arranged that compensating opposite movements will be given to the ends of each rocker-arm, but the relative motion of the said rocker-arms, will be such as to transmit to the sleeves 2 and 3, an arcuate reciprocating movement, to bring the ports 7 and 8 of the sleeves 2 and 3 into registration with each other and the intake port $p$ of the cylinder, and then close the port quickly and with a correspondingly slower movement bring the port 7$a$, 8$a$ almost into registration with each other and the exhaust port $q$ and then quickly to open the port.

By this construction and operation, I have provided an engine, in which the parallel longitudinal movement of the pistons $c$ are transmitted to the rotary movement of the drive shaft $j$, by the rollers $r$ bearing against the cam $s$, and the fuel from the carbureting apparatus $i$ is conducted through the shaft $j$ in the passageway $l$, and through the radial ports $m$ to the chamber $n$, where it is admitted to the cylinders through the ports $p$ as they are quickly opened and then quickly closed, and then after the cylinder has been fired, the waste gases are cleanly exhausted through the port $q$ as it is quickly opened and then quickly closed.

I claim:

1. In an internal combustion engine of the character described, comprising a shaft and a cylinder arranged parallel with the shaft, the combination of a sleeve valve element located within and controlling the ports of the cylinder, said sleeve valve element comprising members rotatable one within the other, a piston reciprocated within said sleeve valve element, a driving connection between the piston and the shaft, plural transverse cams carried by said shaft in parallel planes, rocker arms operated by said cams, said rocker arms having members riding on said cams, respectively, means connecting the rocker arms with the members of said valve elements, respectively and the contour of said cams being adapted to impart to said rocker arms an oscillating movement, whereby to operate the members of said sleeve valve element relatively to the operation of said piston.

2. In an internal combustion engine of the character described, comprising a shaft and a cylinder arranged parallel with the shaft, the combination of a sleeve valve element located within and controlling the ports of the cylinder, said sleeve valve element comprising two members rotatable one within the other, a piston reciprocated within said sleeve valve element, a driving connection between the piston and the shaft, plural transverse cams carried by said shaft in parallel planes, rocker arms operated by said cams, said rocker arms having two oppositely extending members one thereof riding on one, and the other riding on the other of said cams, links connecting the rocker arms with the members of said valve elements, respectively and the contour of said cams being adapted to impart to said rocker arms an oscillating movement, whereby to operate the members of said sleeve valve element relatively to the operation of said piston.

3. In an internal combustion engine of the character described, comprising a shaft and a cylinder arranged parallel with the shaft, the combination of a sleeve valve element located within and controlling the ports of the cylinder, said sleeve valve element comprising two members rotatable one within the other, a piston reciprocated within said sleeve valve element, a driving connection between the piston and the shaft, plural transverse cams carried by said shaft in parallel planes, rocker arms operated by said cams, said rocker arms having two oppositely extending members one thereof riding on one, and the other riding on the other of said cams, rollers journaled in the ends of the members of said rocker arms, links connecting the rocker arms with the members of said valve elements, respectively and the contour of said cams being adapted to impart to said rocker arms an oscillating movement, whereby to operate the members of said sleeve valve element relatively to the operation of said piston.

4. In an internal combustion engine of the character described, comprising a shaft and a cylinder arranged parallel with the shaft, the combination of a sleeve valve element located within and controlling the ports of the cylinder, said sleeve valve element comprising members rotatable one within the other, a piston reciprocated within said sleeve valve element, a driving connection between the piston and the shaft, plural transverse cams carried by said shaft in parallel planes, means adapted to impart to said rocker arms an arcuate reciprocating movement, whereby to operate the members of said sleeve valve element relatively to the operation of said piston and the contour of said cams being adapted to impart to said rocker arms oscillating movement, whereby to operate the members of said sleeve valve element relatively to the operation of said piston.

5. In an internal combustion engine of the character described, comprising a shaft and a cylinder arranged parallel with the shaft, the combination of a sleeve valve element located within and controlling the ports of the cylinder, said sleeve valve element comprising members rotatable one within the other, a piston reciprocated within said sleeve valve element, a driving connection between the piston and the shaft, plural transverse cams carried by said shaft in parallel planes, means carried by the shaft adapted to impart to said rocker arms an arcuate reciprocating movement, whereby to operate the members of said sleeve valve element relatively to the operation of said piston and the contour of said cams being adapted to impart to said rocker arms an oscillating movement, whereby to operate the members of said sleeve valve element relatively to the operation of said piston.

HARRY W. EARL.